(No Model.)

J. T. WOODS.
MACHINE FOR COATING POP CORN.

No. 475,840. Patented May 31, 1892.

Witnesses
M. E. Fowler
D. P. Nothampton

Inventor
James T. Woods
By his Attorneys,
C. A. Snow & Co.

UNITED STATES PATENT OFFICE.

JAMES T. WOODS, OF MANTI, UTAH TERRITORY.

MACHINE FOR COATING POP-CORN.

SPECIFICATION forming part of Letters Patent No. 475,840, dated May 31, 1892.

Application filed June 6, 1891. Serial No. 395,302. (No model.)

*To all whom it may concern:*

Be it known that I, JAMES T. WOODS, a citizen of the United States, residing at Manti, in the county of San Pete and Territory of Utah, have invented a new and useful Machine for Coating Pop-Corn, of which the following is a specification.

My invention relates to an improvement in machines for preparing Indian maize or popcorn which has been popped in the ordinary manner for use as a confection, both for eating and decorative purposes; and it has for its object to provide an article by an improved apparatus that will avoid the disagreeable effect of handling confectioned pop-corn, either in the form of balls, cakes, or otherwise, during the hot months, as the same becomes sticky and unsalable on account of flies, dust, &c., and also being apt to dissolve and run during damp weather. To avoid all of these objections, it is the object of my invention to coat the pop-corn with the material desired, so that each separate grain will be coated independently and separately from the other grains and when finished will not stick or adhere in any way, but will always be easily and readily handled, inasmuch as the popcorn kernels will always be separate when preferred and can be easily boxed or sacked so as to preserve it from flies, dust, or samplers.

With these objects in view my invention consists of certain novel features hereinafter more fully described, illustrated in the accompanying drawings, and specifically pointed out in the appended claims.

Figure 1:
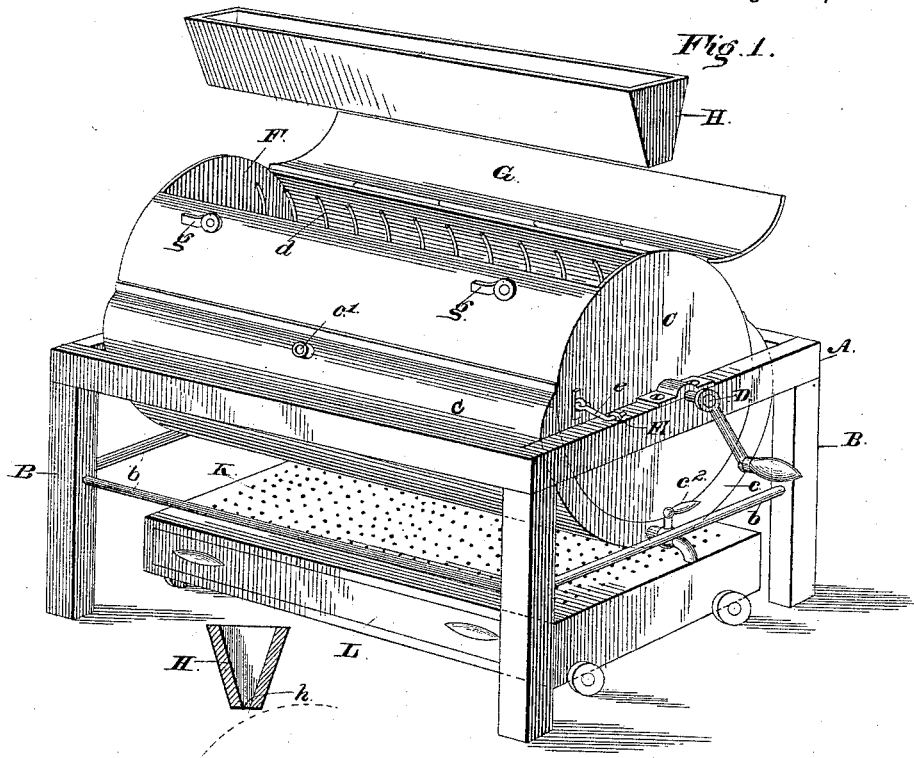
Figure 2:
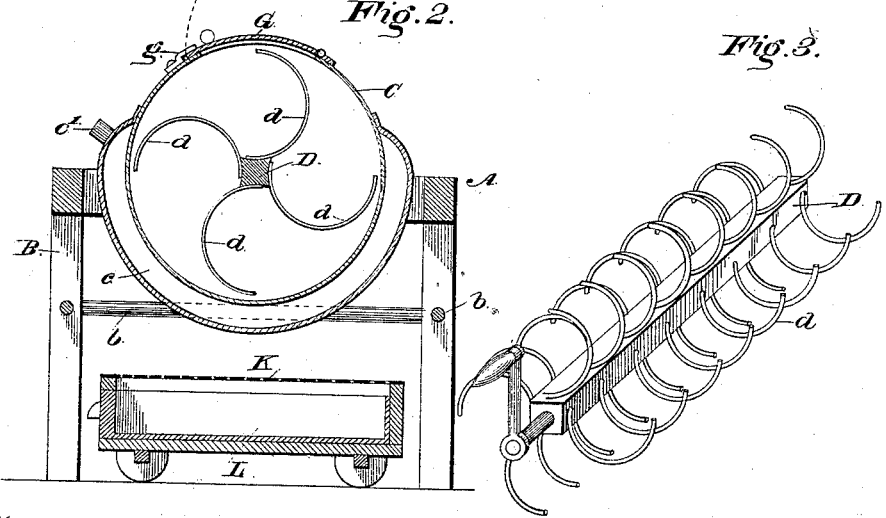
Figure 3:
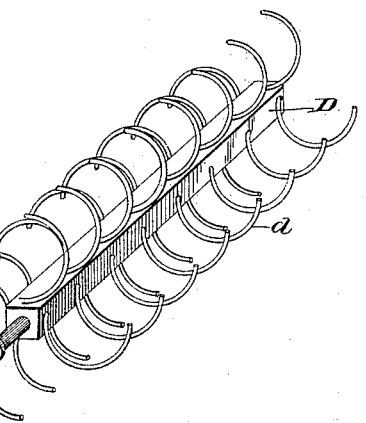

In the accompanying drawings, Figure 1 is a perspective view of an agitating-cylinder and a drying-screen therebeneath constructed in accordance with my invention. Fig. 2 is a transverse sectional view; Fig. 3, a detail in perspective of the agitator.

Referring to the accompanying drawings, A designates a rectangular frame supported by the legs B, which are suitably braced by means of braces $b$. Mounted within said frame is a cylinder C, which is provided with an external jacket $c$, extending entirely around the lower half of said cylinder, and is provided with an inlet-opening $c'$ and a discharge-cock $c^2$ in order that said cylinder may be kept in a heated condition by means of either hot water or steam being supplied to the space inclosed by said jacket through the inlet and exhausted through the discharge-cock. Mounted within said cylinder and journaled on each end of the rectangular frame is an agitator-shaft D, that furnishes a support for said cylinder within the frame and upon which the same may revolve to discharge its contents when necessary, said shaft being further provided with a series of bowed agitator-arms $d$, that are designed to keep the corn thoroughly agitated during the process of coating.

The cylinder is held in position during the coating of the corn by means of a staple E, secured to the frame and engaged by a hook $e$, attached to the said cylinder, thus locking the same in its normal position, allowing it to be easily freed and revolved about the agitator-shaft, which supports it in the frame, in order to discharge the coated pop-corn. The longitudinal opening F, extending the entire length of the cylinder, is kept closed while the corn is being agitated through the coating substances by means of a hinged cover G, secured to the upper side of the same and held closed by the latches $g$, engaging the free edge of said cover when inclosing the opening. The coating substances are evenly fed to the corn within the cylinder through a suitable trough H, provided with a longitudinal opening $h$ in its lower edge, and extends over the entire length of the opening in the top of the cylinder.

When the corn has been subjected to the double coating of my process hereinafter described, the cylinder is released from its fastening to the frame, revolved about said agitator-shaft, and discharges its coated contents upon a perforated screen K, that is placed beneath said cylinder and which allows the surplus sugar and defective corn to pass to a tray L, beneath the screen referred to.

In operating this apparatus the maize or pop-corn is first popped in the ordinary manner and a sufficient quantity, as may be desired, is placed within the cylinder, which is kept warm by passing steam into the inclosed space surrounding the cylinder, or placing hot water in the same when steam is unavailable. A mixture of glucose and ordinary sugar is boiled to a suitable consistence and is then placed in the trough above the cylinder and allowed to drip from the same evenly upon the pop-corn within the cylinder in a very thin sheet, the corn in the meantime being kept in a shifting motion by the action of the agitator upon the same. Sufficient quantity of the sirup, which may be colored in any desirable shade by the use of non-deleterious substances, is fed within the cylinder and with which the pop-corn is brought in contact by means of the agitator-arms, which thoroughly commingle the same together. At the proper time, when deemed advisable, finely-pulverized white sugar is added and a repetition of the stirring operation performed, which gives to the coated pop-corn an even and smooth coating and produces a sugar-coated pop-corn the kernels of which will not adhere to each other, but will always keep separate and will not be affected by changes in the temperature or the weather, as well as an article that especially adapts itself for decorating purposes on account of the colors used in the preparation of the same. After receiving the second coating the cylinder is released from its fastening to the frame and is revolved about said agitator-shaft and discharges the coated contents upon the screen placed beneath the same, allowing the surplus sugar and defective corn to be separated from the good material.

Having thus described my invention, what I claim, and desire to secure by Letters Patent, is—

1. In an apparatus for sugar-coating pop-corn, a frame, a jacketed revoluble cylinder, an agitator-shaft mounted within said cylinder and journaled in the said frame, and means for detachably securing said revoluble cylinder to said frame jointly with a drying-screen beneath said cylinder, substantially as set forth.

2. In an apparatus for sugar-coating pop-corn, a rectangular frame, a revoluble cylinder located within said frame and provided with a jacket inclosing the lower half of said cylinder and a longitudinal opening and cover therefor, an agitator-shaft provided with a series of independent bowed agitator arms or fingers mounted within said cylinder and journaled in the ends of said rectangular frame, and suitable fastening means securing said cylinder to said frame jointly with a drying screen and tray located directly beneath said cylinder and adapted to receive the discharged contents of the same and separate the superfluous sugar and defective corn from the good material, substantially as set forth.

In testimony that I claim the foregoing as my own I have hereto affixed my signature in presence of two witnesses.

JAMES T. WOODS.

Witnesses:
A. E. MERRIAM,
JOHN REID.